(12) United States Patent
Rose et al.

(10) Patent No.: US 10,224,714 B1
(45) Date of Patent: *Mar. 5, 2019

(54) MULTI-SOURCE POWER SUPPLY

(71) Applicant: Twitter, Inc., San Francisco, CA (US)

(72) Inventors: Jeffrey Rose, San Francisco, CA (US);
Paul Thies, San Francisco, CA (US);
Jennifer Fraser, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,720

(22) Filed: Jun. 12, 2017

Related U.S. Application Data

(63) Continuation of application No. 14/212,725, filed on Mar. 14, 2014, now Pat. No. 9,680,390.

(60) Provisional application No. 61/798,719, filed on Mar. 15, 2013.

(51) Int. Cl.
*H02J 1/00* (2006.01)

(52) U.S. Cl.
CPC ..................... *H02J 1/00* (2013.01)

(58) Field of Classification Search
CPC ................. H02M 7/06; H02J 1/00; H02J 3/42
See application file for complete search history.

(56) References Cited

U.S. PATENT DOCUMENTS 9,680,390 B1 * 6/2017 Rose .................. H02J 1/00
2011/0216562 A1 9/2011 Gengenbach \* cited by examiner

*Primary Examiner* — Robert Deberadinis
(74) *Attorney, Agent, or Firm* — Fish & Richardson P.C.

(57) ABSTRACT

A multi-source power supply for supplying power that includes a first rectifier configured to convert a first AC power signal from a first source to a first DC power signal, a second rectifier configured to convert a second AC power signal from a second source to a second DC power signal and a common bus operatively connected to the first rectifier and the second rectifier and configured to combine a the DC power signals into a combined DC power signal, where the common bus distributes the combined DC power signal to at least one server.

20 Claims, 6 Drawing Sheets

MULTI-SOURCE POWER SUPPLY

CROSS-REFERENCE TO RELATED APPLICATIONS

This is a continuation of U.S. application Ser. No. 14/212,725, filed on Mar. 14, 2014, now U.S. Pat. No. 9,680,390, which claims priority to U.S. Provisional Application No. 61/798,719, filed on Mar. 15, 2013. The disclosures of the prior applications are considered part of and are incorporated by reference in the disclosure of this application.

BACKGROUND

Servers, like all electronic components, are prone to power interruption. Existing hardware with single power supplies may not easily be modified to accept a second power supply. Even existing servers with redundant power supplies typically require an onboard switch in case of an outage. Alternate solutions, which provide for switching upstream of the server, are costly and often cannot be installed due to space or performance constraints.

SUMMARY

In general, in one aspect, the invention relates to multi-source power supply for supplying power, comprising a first rectifier configured to convert a first AC power signal from a first source to a first DC power signal, a second rectifier configured to convert a second AC power signal from a second source to a second DC power signal, and a common bus operatively connected to the first rectifier and the second rectifier and configured to combine a plurality of DC power signals comprising the first DC power signal and the second DC power signal into a combined DC power signal, wherein the common bus distributes the combined DC power signal to at least one server.

In general, in one aspect, the invention relates to a system for supplying power, comprising at least one server, a first rectifier configured to convert a first AC power signal from a first source to a first DC power signal, a second rectifier configured to convert a second AC power signal from a second source to a second DC power signal, and a common bus operatively connected to the first rectifier, the second rectifier, and the at least one server, and configured to combine a plurality of DC power signals comprising the first DC power signal and the second DC power signal into a combined DC power signal, wherein the common bus distributes the combined DC power signal to the at least one server.

Other aspects of the invention will be apparent from the following description and the appended claims.

DETAILED DESCRIPTION

Figure 1A:
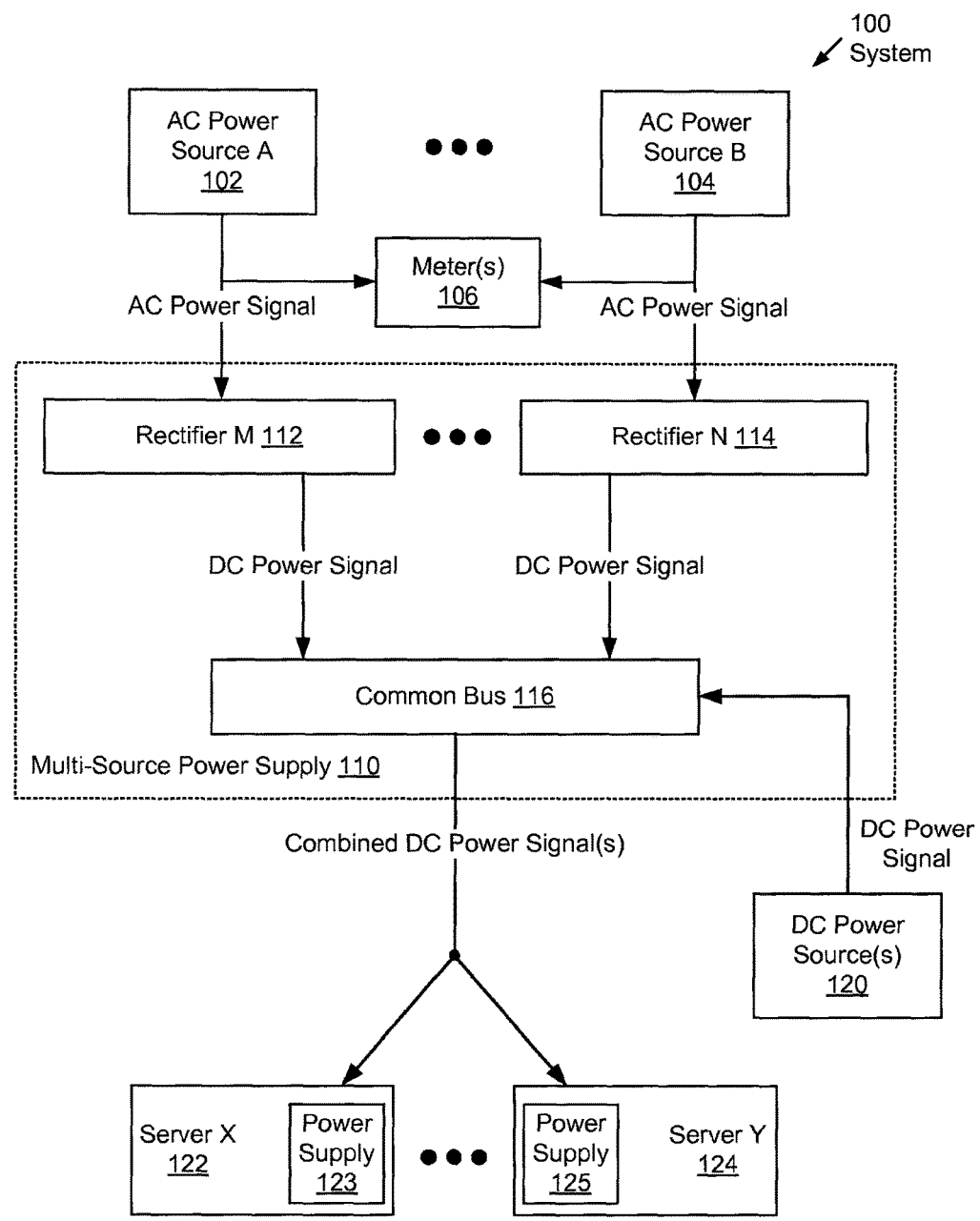
FIG. 1A shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a multi-source power supply for providing electrical power to one or more servers or other electrical loads. Specifically, one or more embodiments of the invention include generating multiple direct current (DC) power signals by rectifying multiple alternating current (AC) power signals from any number of AC sources. These multiple DC power signals are combined onto a common bus. One or more DC sources (e.g., batteries) may be connected to the common bus, and the common bus is connected to the one or more servers. The common bus provides combined DC power signal to the one or more servers. The common bus may provide combined DC power signal to the one or more servers even when one or more of the AC or DC sources fail.

FIG. 1A shows a system in accordance with one or more embodiments of the invention. The system (100) includes one or more AC power sources (102, 104), one or more meters (106), a multi-source power supply (110), one or more DC power sources (120), and one or more servers (122, 124). Each of these components is described below.

In one or more embodiments of the invention, the one or more AC power sources (102, 104) include functionality to supply AC power signals. Each AC power source (102, 104) may be, for example, a public utility, a local AC generator, a power outlet, etc. Each AC power source (102, 104) may supply a single-phase or multi-phase (e.g., three-phase) power signal. In one or more embodiments of the invention, all AC power sources (102, 104) may provide AC power signals having one or more equivalent properties (e.g., voltage, current, phases, etc.). In one or more embodiments of the invention, two or more of the AC power sources may differ with respect to the voltages, current, phases, and/or other properties of the AC power signals they provide.

In one or more embodiments of the invention, the one or more meters (106) include functionality to monitor properties of AC and/or DC power signals (e.g., voltage, current, watts, power factor, harmonics, etc.). Accordingly, each meter (106) may include, for example, a wattmeter, voltmeter, multimeter, oscilloscope, spectrum analyzer, and/or any other device configured to measure or calculate characteristics of a power signal between components. In one or more embodiments of the invention, a meter (106) may be operatively connected to any two or more components in the system (100), in order to measure, for example, voltage between components. Although the meter(s) (106) is depicted in FIG. 1A as operatively connected to one or more AC power sources (102, 104) and one or more rectifiers (112, 114), other configurations may include meter(s) (106)

operatively connected to a rectifier (112, 114) and the common bus (116), to the common bus (116) and a DC power source (120), and/or to the common bus (116) and a server (122, 124).

In one or more embodiments of the invention, the multi-source power supply (110) includes functionality to receive multiple AC power signals and to distribute combined DC power signal(s) to one or more destinations. The multi-source power supply (110) includes one or more rectifiers (112, 114) and a common bus (116). Each of these components is described below.

In one or more embodiments of the invention, one or more rectifiers (112, 114) include functionality to convert AC power signals into DC power signals (i.e., rectification). The DC power signal output by each rectifier is a rectified AC power signal. The DC power signal output by each rectifier may not have a constant level voltage (e.g., as compared to a DC power signal provided by a battery), but the DC power signal's current is unidirectional. In other words, the DC power signal maintains either a positive voltage or a negative voltage, and does not alternate. Each rectifier may include circuitry and circuit elements (e.g., diodes) to convert an AC power signal into a DC power signal. Each rectifier may or may not include a filter component. One or more embodiments of the invention may include one rectifier per AC power source (102, 104). Each rectifier may convert an AC power signal into a DC power signal. In one or more embodiments of the invention, a single rectifier may be shared by multiple AC power sources. The one or more rectifiers (112, 114) may include single-phase rectifiers, three-phase rectifiers, three-phase bridge rectifiers, and/or voltage-multiplying rectifiers. The one or more rectifiers (112, 114) may include functionality to perform half-wave rectification or full-wave rectification.

In one or more embodiments of the invention, the one or more DC power sources (120) include functionality to supply one or more DC power signals. A DC power source may be a battery or battery string of any type (e.g., nickel-cadmium, lead-acid, etc.), solar cells, thermocouples, a DC generator, etc. The DC power signal may have any voltage, and the voltage may be constant. In one or more embodiments of the invention, the waveform of the DC power signal from the DC power source (120) approximates the waveform(s) of one or more DC power signals output by the rectifier(s) (112, 114). In one or more embodiments of the invention, the DC power signal output by the DC power source may have a substantially dissimilar waveform than the DC power signal(s) output by the one or more rectifier(s). For example and without limitation, the waveforms would be substantially dissimilar if the DC power signal output by the DC power source has a constant voltage and the DC power signal output by one of the rectifiers has a waveform as shown in FIG. 1C.

In one or more embodiments of the invention, the common bus (116) includes functionality to receive multiple DC power signals and output a combined DC power signal to one or more destinations. The common bus (116) may be considered a conductor(s) and/or transmission line(s) over which a DC signal(s) may propagate. As shown in FIG. 1, the common bus (116) is connected to the output(s) of the rectifier(s) (112, 114), and/or the common bus (116) is connected to the DC power source (120). Accordingly, the DC power signals generated by the rectifiers (112, 114) and supplied by the DC power source (120) may be combined by the common bus (116).

In one or more embodiments of the invention, the one or more servers (122, 124) include functionality to respond to requests across a computer network. In order to operate, the servers (122, 124) require electrical energy that may be acquired, at least in part, from the common bus (116). Specifically, the common bus (116) may distribute a combined DC power signal to the one or more servers (122, 124). The combined DC power signal output from the common bus (116) may match one or more power requirements of the one or more servers (122, 124) (e.g. voltage range, current, etc.). Although FIG. 1 depicts servers, the common bus (116) may distribute a combined DC power signal to any type of electrical load. In one or more embodiments of the invention, the servers (122, 124), the rectifiers (112, 114), and/or the DC power source (120), may be connected to the common bus (116) in parallel.

In one or more embodiments of the invention, each server (122, 124) may include an onboard power supply (123, 125). The power supply (123, 125) to a server (122, 124) may be configured to receive AC or DC power signals from one or more external devices, process those power signals, and provide a DC power signal to other subcomponents of the server (122, 124). The power supply to a server may have one or more power requirements including, for example, a specified voltage range, current, or any other specification(s) required for incoming power signals. In one or more embodiments of the invention, combined DC power signals may be provided to the power supply (123, 125) on each server (122, 124) by the common bus (116), and each combined DC power signal may conform to the power requirements of the power supply (123, 125) onboard the server (122, 124) that receives the combined DC power signal.

Persons of ordinary skill in the art will appreciate that a typical server is manufactured with an onboard power supply that includes one or more rectifiers, filters, transformers, and/or other components normally used to convert an AC signal to a DC signal. However, by rectifying an AC power signal in advance of bussing and providing the resulting combined DC power signal to a power supply onboard a server, one or more steps of the conversion normally performed by the onboard power supply (e.g., input rectification) may become redundant. In other words, one or more components of an onboard power supply designed to receive an AC power signal may have no transformational effect on an incoming combined DC power signal, without impact on the additional functions of the power supply or the server.

In one or more embodiments of the invention, if one or more of the power sources (102, 104, 120) or one or more of the rectifiers (112, 114) fail, the common bus (116) may continue to be supplied with DC power, and the servers (122, 124) may continue to operate without interruption. In one or more embodiments of the invention, the failure of any AC or DC power source (102, 104, 120) may be transparent to the servers (122, 124). Those skilled in the art, having the benefit of this detailed description, will appreciate that by rectifying AC power signals to DC power signals and then distributing the combined DC power signals to the electrical loads, the burden of converting AC power to DC power is taken off the electrical loads. Moreover, by performing the rectification upstream, redundant AC and/or DC power sources may be added and/or removed without impact on the operation, function, or circuits of the electrical loads.

While FIG. 1A shows a configuration of components, other configurations may be used without departing from the scope of the invention. For example, various components may be combined to create a single component. As another example, the functionality performed by a single component may be performed by two or more components.

Figure 1B:
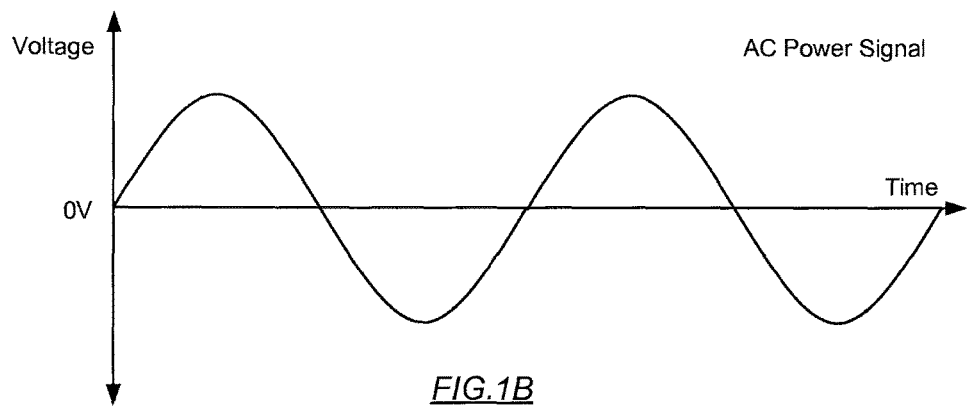
FIG. 1B shows a graph in accordance with one or more embodiments of the invention.
Figure 1C:
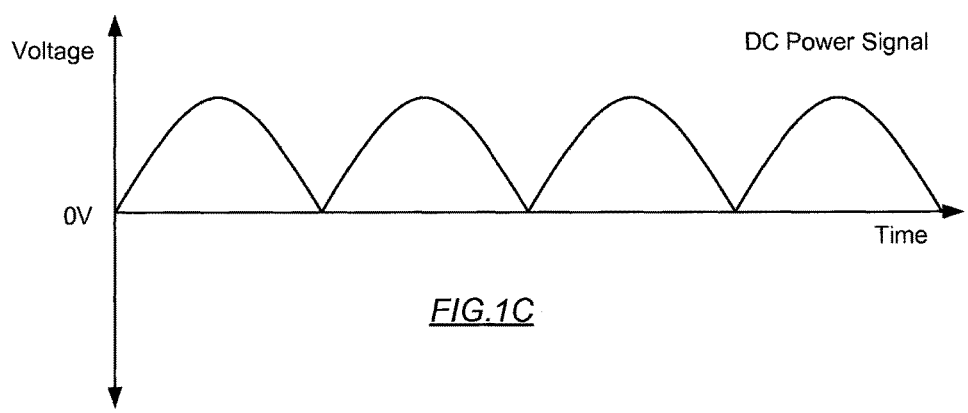
FIG. 1C shows a graph in accordance with one or more embodiments of the invention.

FIG. 1B shows a graph in accordance with one or more embodiments of the invention. The graph depicts a sine waveform showing voltage over time for an exemplary single-phase AC power signal. In reference to FIG. 1A, one or more of the AC power signals provided from the AC power sources (102, 104) to the rectifiers (112, 114) may be approximated by the waveform depicted in FIG. 1B.

FIG. 1C shows a graph in accordance with one or more embodiments of the invention. The graph depicts a waveform showing voltage over time for an exemplary DC power signal resulting from rectifying the AC power signal shown in FIG. 1B. In reference to FIG. 1A, one or more of the DC power signals provided from the rectifiers (112, 114) to the common bus (116) may be approximated by the waveform depicted in FIG. 1C.

Figure 1D:
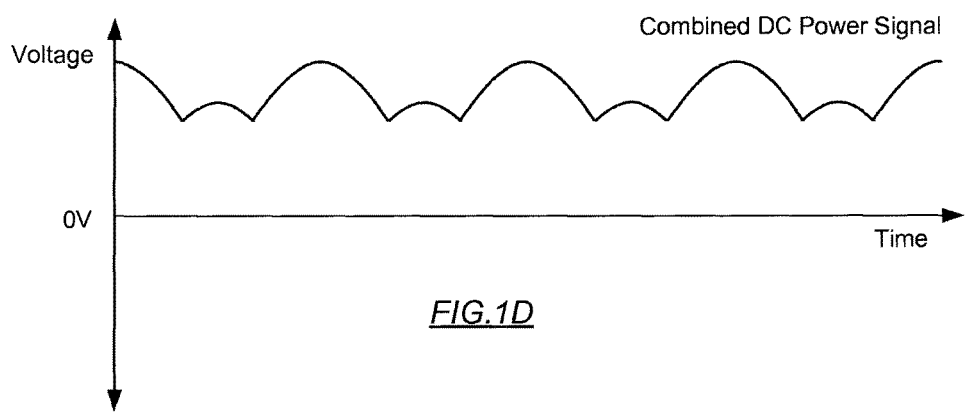
FIG. 1D shows a graph in accordance with one or more embodiments of the invention.

FIG. 1D shows a graph in accordance with one or more embodiments of the invention. The graph depicts a waveform showing voltage over time for an exemplary combined DC power signal resulting from combining multiple DC power signals similar to the DC power signal shown in FIG. 1C. In reference to FIG. 1A, one or more of the DC power signals provided from the common bus (116) to the servers (122, 124) may be approximated by the waveform depicted in FIG. 1C. Note that FIG. 1D depicts an embodiment in which multiple out-of-phase DC power signals have been combined, but other embodiments may provide for combining multiple in-phase DC power signals. In the second case, the combined DC power signal would appear similar to the DC power signal shown in FIG. 1C, but having a larger amplitude.

Figure 1E:
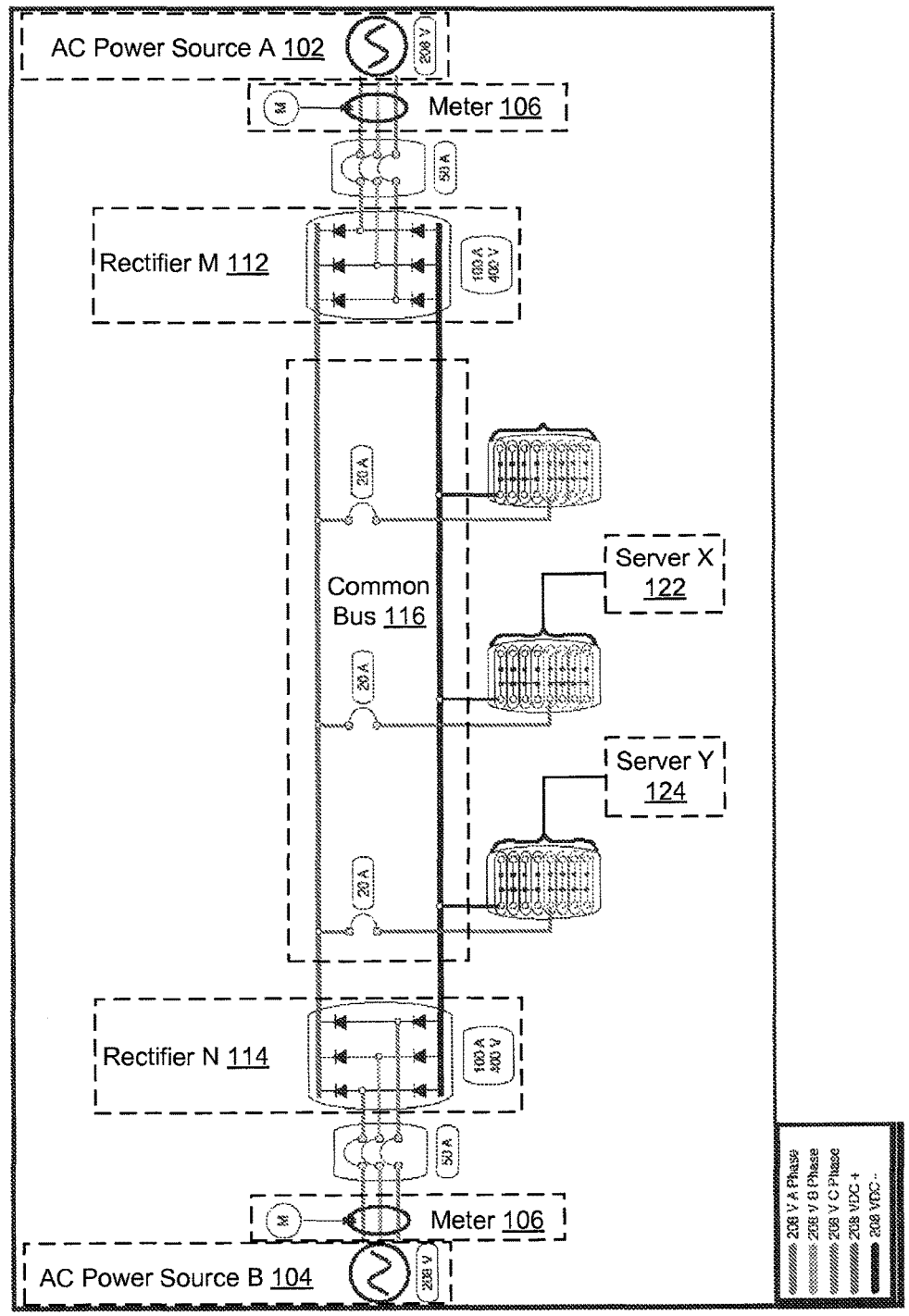
FIG. 1E shows a schematic in accordance with one or more embodiments of the invention.

FIG. 1E shows a schematic in accordance with one or more embodiments of the invention. The schematic depicts an implementation of a multi-source power supply configured to receive three-phase AC power signals. FIG. 1E provides a configuration including several of the components shown in FIG. 1A, specifically, two AC power sources (102, 104), two rectifiers (112, 114), at least one meter (106) operatively connected to the AC power sources (102, 104) and the rectifiers (112, 114), a common bus (116) operatively connected to the rectifiers (112, 114), and two servers (122, 124) operatively connected to the common bus (116). While FIG. 1E shows a configuration of components, other configurations may be used without departing from the scope of the invention.

Figure 1F:
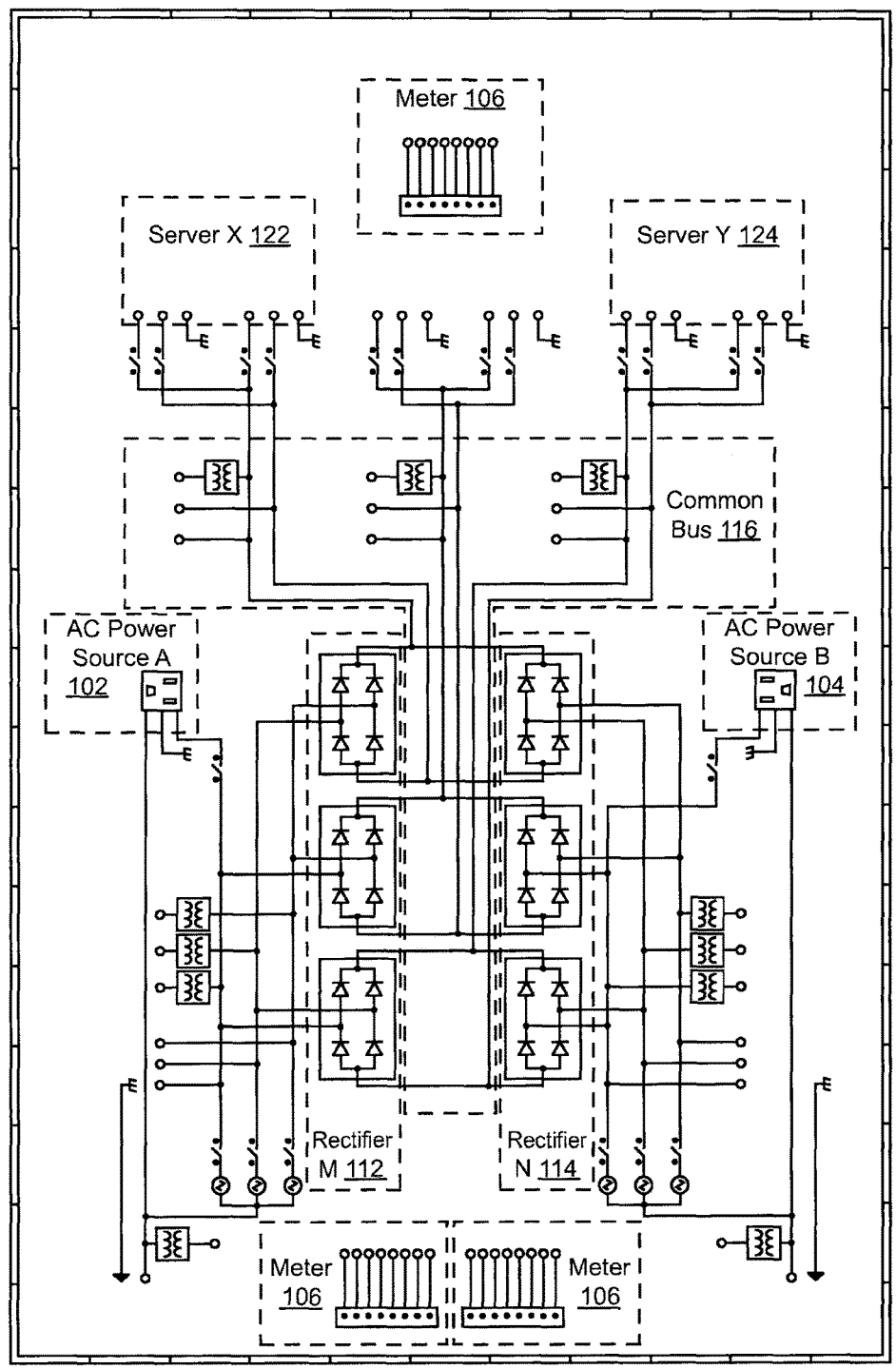
FIG. 1F shows a schematic in accordance with one or more embodiments of the invention.

FIG. 1F shows a schematic in accordance with one or more embodiments of the invention. The schematic depicts an implementation of a multi-source power supply configured to receive single-phase AC power signals. FIG. 1F provides a configuration including several of the components shown in FIG. 1A, specifically, two AC power sources (102, 104), two rectifiers (112, 114), two meters (106) each operatively connected to an AC power source (102, 104) and a rectifier (112, 114), a common bus (116) operatively connected to the rectifiers (112, 114), two servers (122, 124) operatively connected to the common bus (116), and one meter operatively connected to the common bus (116) and the two servers (122, 124). Although FIG. 1F depicts a third server between Server X (122) and Server Y (124), the third server is intentionally unlabeled. While FIG. 1E shows a configuration of components, other configurations may be used without departing from the scope of the invention.

Figure 2:
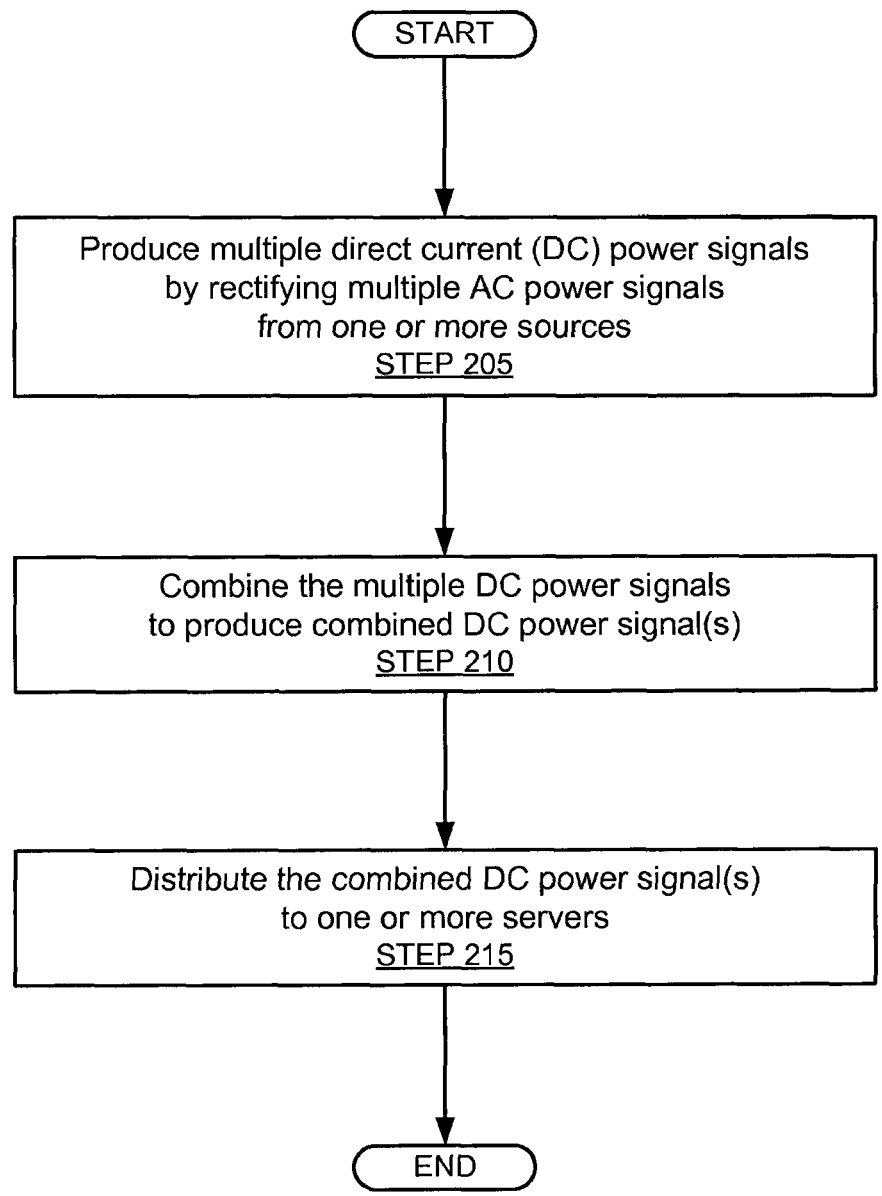
FIG. 2 shows a flowchart in accordance with one or more embodiments of the invention.

FIG. 2 shows a flowchart in accordance with one or more embodiments of the invention. The process shown in FIG. 2 may correspond to the operation of a multi-source power supply. Moreover, the process shown in FIG. 2 may utilize one or more of the components of the system (100) described above in reference to FIG. 1. While the various steps in this flowchart are presented and described sequentially, one of ordinary skill will appreciate that some or all of the steps may be executed in different orders, may be combined or omitted, and some or all of the steps may be executed in parallel.

In Step 205, multiple DC power signals are produced by rectifying multiple AC power signals from one or more AC power sources. Specifically, one or more rectifiers may be used to convert the AC power signals into DC power signals. The AC power signals may originate from the same source or from different sources. Without rectification, AC power signals cannot typically be paralleled unless they originate from the same source, in which case the signals' waveforms are synchronous. However, once the AC power signals are rectified according to one or more embodiments of the invention, the resulting DC power signals may be paralleled according to Step 210 regardless of phase sequence, voltage, or frequency.

In Step 210, the multiple DC power signals produced in the previous step are combined by the common bus to produce combined DC power signal(s). Additionally, the common bus may add to the combination DC power signals provided directly by DC power sources (e.g., battery).

In Step 215, combined DC power signals are distributed to one or more servers (or any type of electrical load). The combined DC power signals may be distributed to power supplies onboard the servers and/or the DC power signals may be hardwired directly into the servers' circuit boards.

Figure 3:
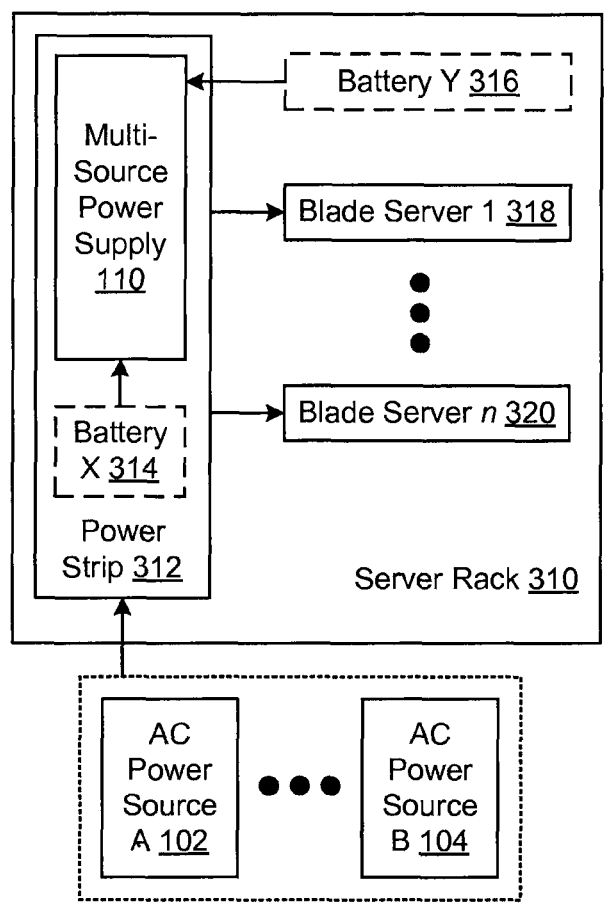
FIG. 3 shows an example in accordance with one or more embodiments of the invention.

FIG. 3 shows an exemplary configuration of the system (100) in accordance with one or more embodiments of the invention. The example is included for explanatory purposes only and not intended to limit the scope of the invention. The configuration provided includes multiple AC power sources (102, 104), a server rack (310), a power strip (312), a multi-source power supply (110), two batteries (314, 316), and multiple blade servers (318, 320). The batteries (314, 316) are depicted using dashed lines to indicate that they are optional components.

In one or more embodiments of the invention, the multi-source power supply (110) may be affixed to (or integrated within) a power strip (312) on a server rack (310). A battery (314) may also be affixed to (or integrated within) the power strip (312) or may be placed inside the server rack (316). As shown in FIG. 3, in one or more embodiments of the invention, the servers are blade servers (318, 320) configured to fit within the server rack (316).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A system comprising:
   one or more servers each configured to receive DC power signals for powering one or more components of the corresponding server; and
   a multi-source power supply, comprising:
      a first rectifier configured to convert a first AC power signal from a first source to a first DC power signal;
      a second rectifier configured to convert a second AC power signal from a second source to a second DC power signal; and a common bus operatively coupled to the first rectifier and the second rectifier and configured to combine a plurality of DC power signals comprising the first DC power signal and the second DC power signal into a combined DC power signal, wherein the common bus distributes the combined DC power signal to the one or more servers to power one or more components of the corresponding server without input rectification by a server onboard power supply.

2. The system of claim 1, wherein the combined DC power signal conforms to power requirements of the one or more servers.

3. The system of claim 1, wherein one or more of the servers are configured to receive the combined DC power signal directly without passing through the onboard power supply of the server.

4. The system of claim 1, further comprising one or more DC power supplies, wherein the common bus is coupled to the one or more DC power supplies and further configured to combine the DC power signals from the DC power supplies to the combined DC power signal.

5. The system of claim 1, wherein the multi-source power supply is coupled to a server rack that includes the one or more servers.

6. The system of claim 5, wherein the one or more servers are blade servers configured to fit within the server rack.

7. The system of claim 1, wherein the multi-source power supply further comprises a third rectifier configured to convert a third AC power signal from a third AC power source to a third DC power signal.

8. A system comprising:
one or more servers;
one or more AC power sources;
one or more DC power sources providing one or more respective DC power signals; and
a multi-source power supply coupled to the one or more servers, comprising:
  one or more rectifiers configured to convert respective AC power signals from the one or more AC power sources to corresponding one or more rectified DC power signals; and
  a common bus operatively coupled to the one or more rectifiers and the one or more DC power sources and configured to combine a plurality of DC power signals comprising the one or more rectified DC power signals and the one or more DC power signals into a combined DC power signal,
wherein the common bus distributes the combined DC power signal to the one or more servers.

9. The system of claim 8, wherein distributing the combined DC power signal to the one or more servers comprises distributing the combined DC power signal to respective power supplies of the one or more servers.

10. The system of claim 8, wherein the first rectifier, the second rectifier, and the common bus are located in a server rack that includes the one or more servers.

11. The system of claim 8, wherein the first rectifier performs one or more functions selected from a group consisting of half-wave rectification and full-wave rectification.

12. The system of claim 8, wherein the second rectifier is selected from a group consisting of a single-phase rectifier, a three-phase rectifier, and a three-phase bridge rectifier.

13. The system of claim 8, further comprising:
a meter operatively connected to the first source and the first rectifier.

14. The system of claim 13, wherein the meter comprises at least one selected from a group consisting of a wattmeter, a voltmeter, a multimeter, an oscilloscope, and a spectrum analyzer.

15. The system of claim 13, wherein the meter is configured to monitor at least one selected from a group consisting of volts, current, watts, power factor, and harmonics.

16. The system of claim 15, wherein the one or more DC power sources include one or more of a battery, a battery string, a generator, a solar cell, or a thermocouple.

17. A method comprising:
rectifying, using a first rectifier, a first AC power signal received from a first source to a first DC power signal;
rectifying, using a second rectifier, a second AC power signal received from a second source to a second DC power signal; and
distributing, using a common bus coupled to the first rectifier and the second rectifier, a combined DC power signal to one or more servers to power one or more components of the corresponding server without input rectification by a server onboard power supply.

18. The method of claim 17, wherein the combined DC power signal further includes one or more DC power signals received from one of more DC power supplies.

19. The method of claim 17, wherein one or more of the servers are configured to receive the combined DC power signal directly without passing through the onboard power supply of the server.

20. The method of claim 17, further comprising:
rectifying, using a third rectifier, a third AC power signal received from a third source to a third DC power signal.

* * * * *